United States Patent [19]
Glesmann

[11] Patent Number: 5,492,167
[45] Date of Patent: Feb. 20, 1996

[54] LATCHABLY PIVOTABLY-COUPLED HEAT-EXCHANGERS FOR MOTOR-HOME AND RELATED VEHICLES

[76] Inventor: Herbert C. Glesmann, 6145 S. 102nd St., Omaha, Nebr. 68127

[21] Appl. No.: 236,137

[22] Filed: May 2, 1994

Related U.S. Application Data

[63] Continuation-in-part of Ser. No. 914,476, Jul. 15, 1992, Pat. No. 5,314,205.
[51] Int. Cl.⁶ .............................. F28D 1/00; B60K 11/04; F01P 3/18; F02B 29/04
[52] U.S. Cl. .............................. 165/41; 165/77; 165/140; 123/563; 60/599; 180/68.4
[58] Field of Search .............................. 165/77, 140, 41, 165/51, 149; 123/563, 41.31; 60/599; 180/68.4

[56] References Cited

U.S. PATENT DOCUMENTS

| | | | |
|---|---|---|---|
| 3,207,250 | 9/1965 | Bamford | 180/68.4 |
| 3,334,704 | 8/1967 | Gehrke et al. | 180/68.4 |
| 3,834,478 | 9/1974 | Alexander et al. | 165/77 |
| 4,287,961 | 9/1981 | Steiger | 180/68.4 |
| 4,505,348 | 3/1985 | Gadefelt et al. | 123/563 |
| 4,827,890 | 5/1989 | Pociask et al. | 123/563 |
| 4,997,033 | 5/1991 | Ghiani et al. | 165/140 |
| 5,095,882 | 3/1992 | Christensen | 60/599 |
| 5,234,051 | 8/1993 | Weizenburger et al. | 165/77 |

FOREIGN PATENT DOCUMENTS

| | | | |
|---|---|---|---|
| 1500517 | 8/1989 | U.S.S.R. | 180/68.4 |

*Primary Examiner*—John K. Ford
*Attorney, Agent, or Firm*—George R. Nimmer

[57] ABSTRACT

For the environment of motor-home and related roadway vehicles respectively extending along a horizontal and directionally longitudinal central-axis and that terminates as a powertrain-zone including a turbo-charged internal combustion engine vehicular powering means provided with liquid-air radiator that is coupled with an air-air radiator for cooling an airpath therealong including an intake-pipe for conveying environmental air and thence through an incoming-pipe into an engine turbo-charger for conversion into high-pressure-heated-air (HPHA). The HPHA is then conveyed along an outgoing-pipe through an airpath first-interface into the air-air radiator that converts HPHA to high-pressure-cooled-air (HPCA) emerging through an airpath second-interface via an inlead-pipe communicating within said engine, the improvements of:

the parallel and coupled liquid-air and air-air radiators are together pivotably associated with framework for the engine and together pivotably movable away from the engine, the outgoing-pipe and the inlead-pipe; and the parallel, coupled, and pivotal liquid-air and air-air radiators at the airpath first-interface and second-interface are respectively provided with first-removable-coupler means and with second-removable-coupler means along the airpath to accommodate pivotal movements of the coupled liquid-air and air-air radiators.

5 Claims, 3 Drawing Sheets

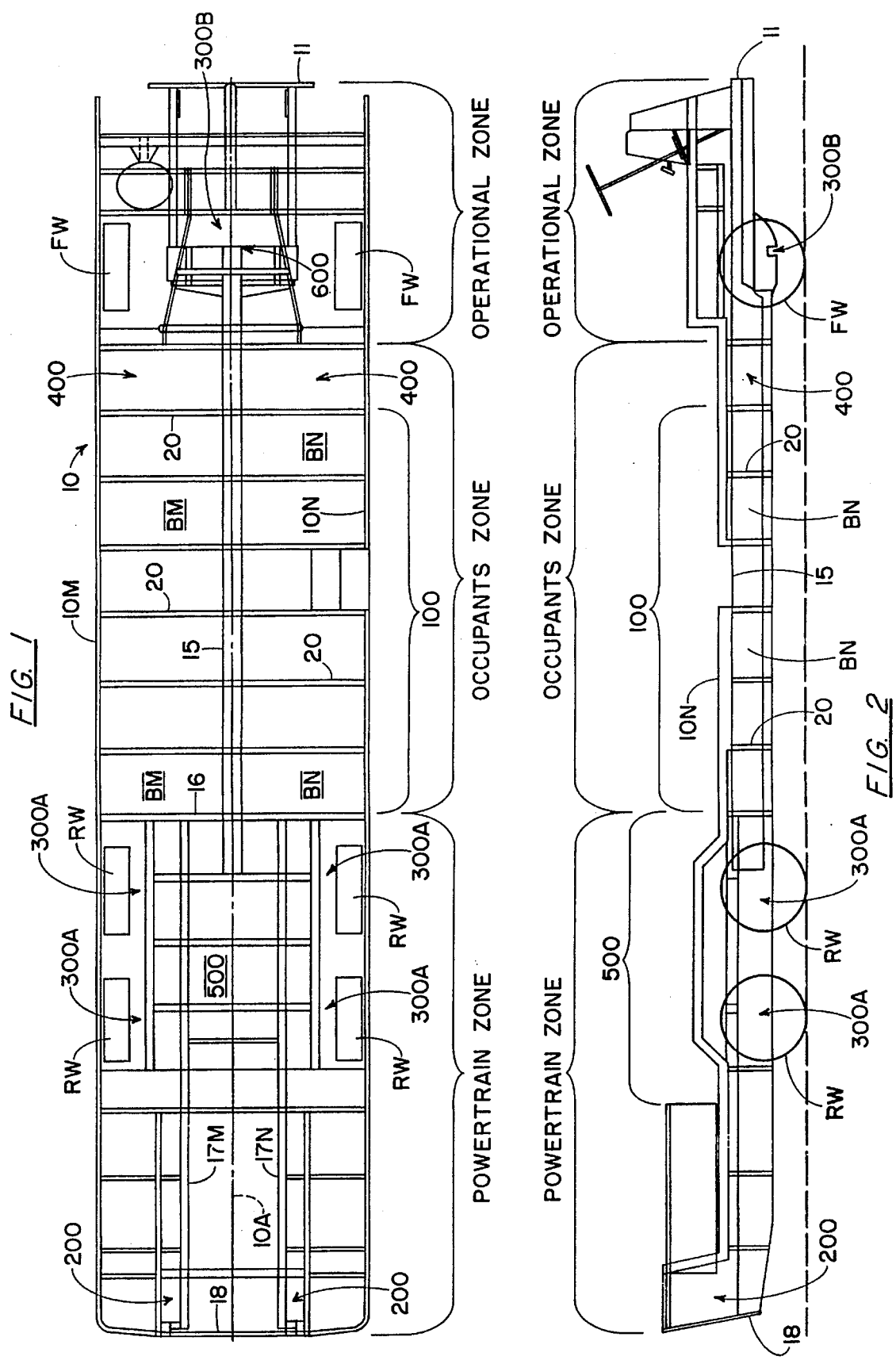

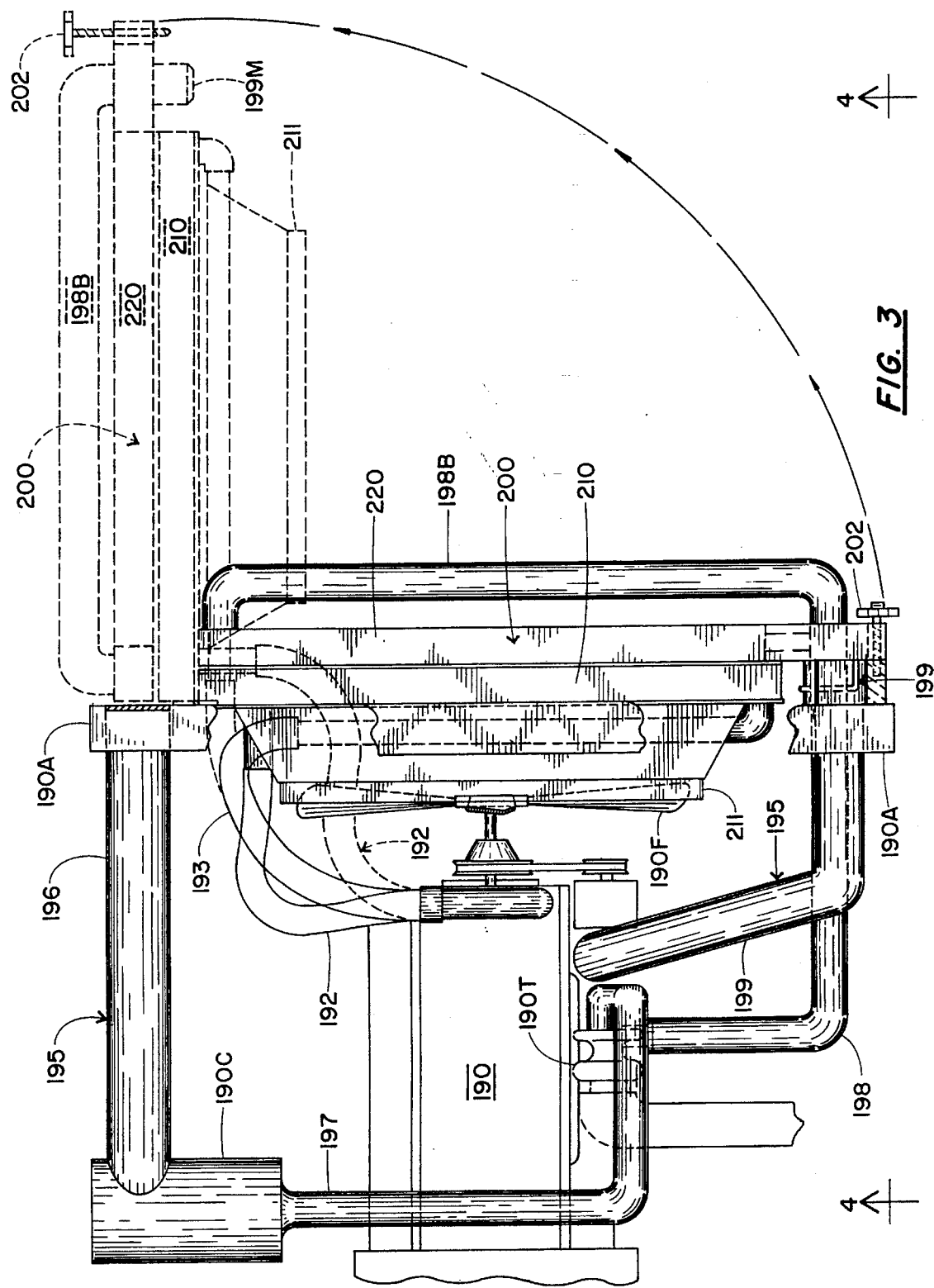

LATCHABLY PIVOTABLY-COUPLED HEAT-EXCHANGERS FOR MOTOR-HOME AND RELATED VEHICLES

RELATED (PARENT AND PENDING) PATENT APPLICATION

The instant application is a continuation-in-part of the parent U.S. patent application Ser. No. 07/914,476 (filed Jul. 15, 1992) now U.S. Pat. No. 5,314,205.

BACKGROUND OF THE INVENTION

Drawing FIGS. 1 and 2 herein are identical to drawing FIGS. 1 and 2 of the parent U.S. patent application Ser. No. 07/914,476 (filed Jul. 15, 1992) now U.S. Pat. No. 5,314, 205. Drawing FIGS. 1 and 2 schematically depict a motor-home vehicle skeletal chassis (e.g. 10) extending horizontally and directionally longitudinally along central-axis 10A. Consecutively longitudinally along said central-axis 10A are:

(i) a frontal-end OPERATIONAL-ZONE (i.e. underlying the vehicle's human-driver and overlying roadway-engageable front-wheels "FW") and which at 600, 610, etc., refer to linkage for connecting vehicular frontal air-springs to a single air-control valve;

(ii) a central OCCUPANTS'-ZONE (i.e. underlying vehicular passengers); and (iii) a rearward POWERTRAIN-ZONE that through an hydrocarbon-fired engine (e.g. diesel, internal-combustion, etc.) and associated powertrain motivates roadway-engageable rear-wheels "RW". Reference character 200 generally refers to a readily-serviceable, latchable pivotably associated heat-exchanger means for cooling the said engine and for cooling the airpath ancillary to a turbocharger-type internal combustion engine, diesel engine, or the like.

OBJECT OF THE INVENTION

In view of the foregoing, it is the general objective of the present invention to retain and incorporate, from patent application Ser. No. 07/914,476, now U.S. Pat. No. 5,314, 205, and appropriately claim herein, the concept for coupling and pivotably associating liquid-air and air-air radiators for cooling the engine (of whatever type) for motor-home vehicles, and during pivotal movements of said coupled radiators to maintain ease of re-installation for said coupled radiators.

BRIEF DESCRIPTION OF THE DRAWING

In the drawing, wherein like characters refer to like parts in the several views, and in which:

Drawing FIGS. 1 and 2 are top plan and side elevational views, respectively, of the motor-home roadway vehicle concept aforedescribed and providing an environment for the readily-serviceable, latchably pivotably-associated heat-exchangers means for the motor-home engine;

Drawing FIG. 3 is a top plan view of the readily-serviceable, latchably pivotably-associated heat-exchangers means for the motor-home concept of the present invention at the motive engine portion thereof;

Drawing

Drawing

DETAILED DESCRIPTION OF THE DRAWING

Figure 4:
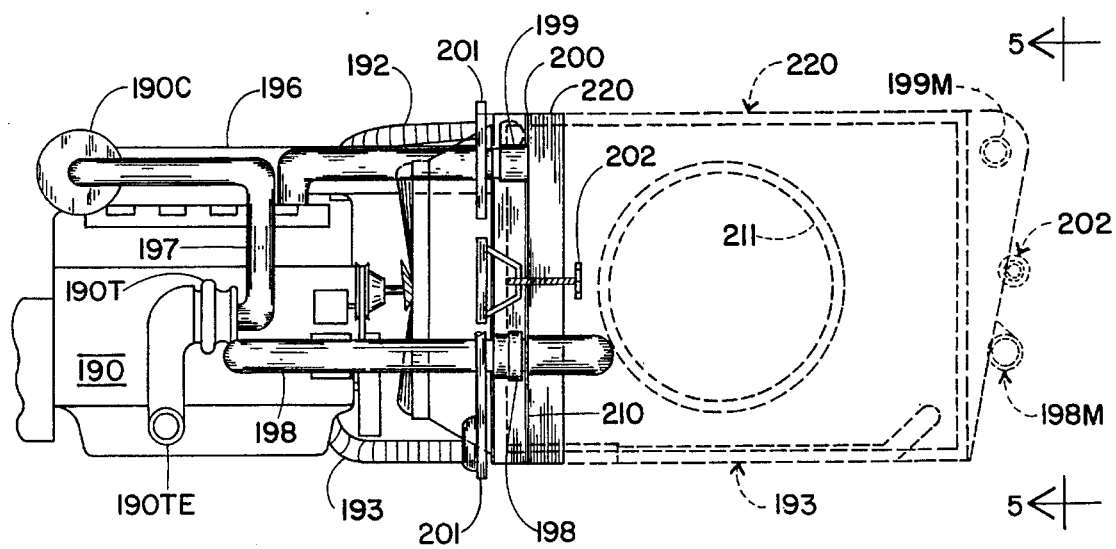
FIG. 4 is an elevational view of drawing FIG. 3, taken along lines 4—4 of FIG. 3.

Reference character 200 generally refers to a readily-serviceable, latchably pivotably associated (e.g. 201, 202, at engine framework 190A) heat-exchangers combination (210, 220), namely an upright liquid-air type radiator (210) for internally cooling an internal combustion engine (190) and coupled to an upright and parallel air-air type radiator (220) for cooling that portion of an airpath serially extending among: the engine turbocharger (190T); thence through first-interface 198A to air-air type radiator 220, and thence through second-interface 199A into the fueling mixture for a said engine (190), Immediately alongside thereof, the said liquid-air type radiator (210) is herein provided with a said upright pivotal hinge (201) at engine framework (190A), and also with an annular shroud 211 for longitudinally channeling an airstream (emanating from engine endward fan 190F) through said coupled, pivotal (201), and latchable (202) combination of upright radiators (210, 220). Said liquid-air type radiator (210) is conventionally provided with a liquidpath for cooling the engine internal combustion products, and which liquidpath conventionally includes a flexible upper-hose (L92) and a flexible lower-hose (193). Herein, the latching means (202) comprises a T-shaped handle carried by radiator 220 and being threadedly engageable with the engine framework (190A).

Figure 5:
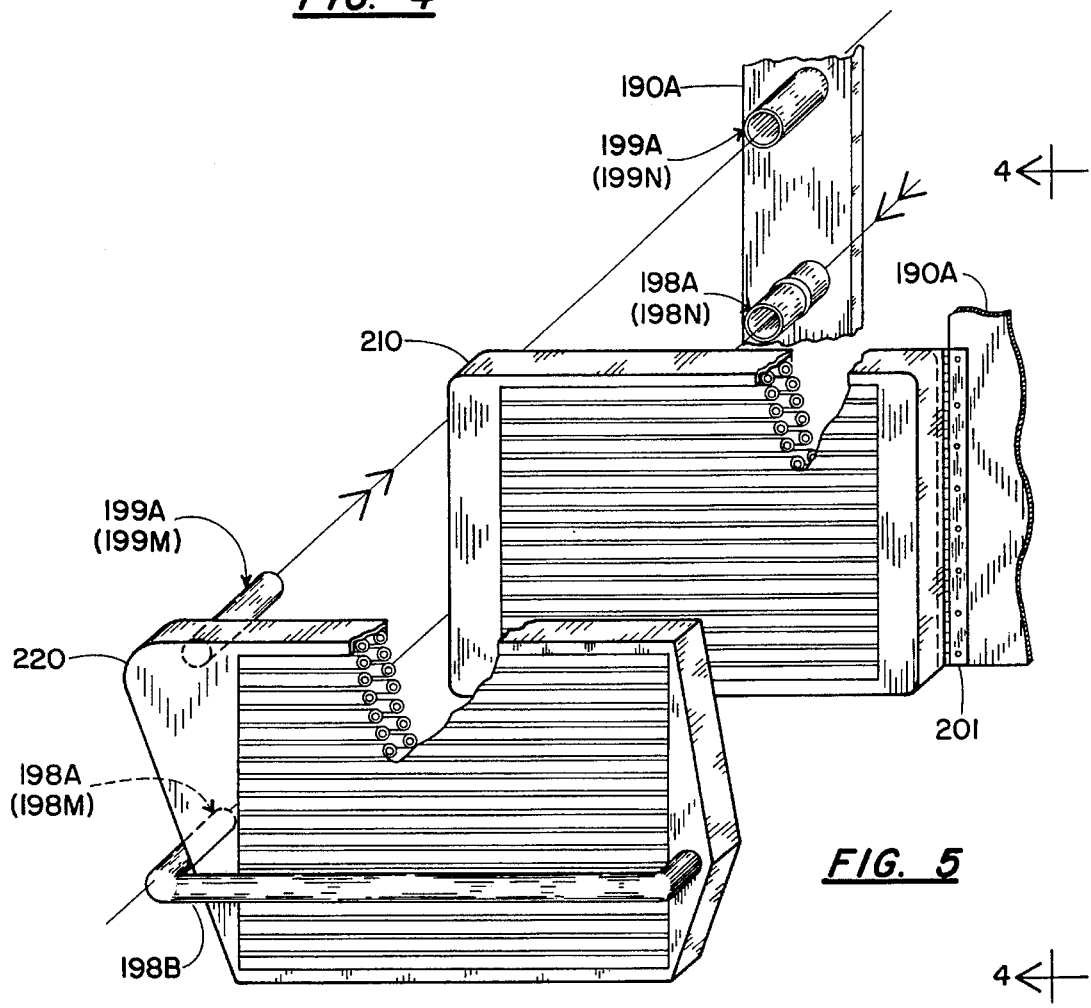
FIG. 5 is a rearward elevational view taken along lines 5—5 of FIGS. 3 and 4.

In further regard to the aforementioned airpath (e.g. 195 extending serially among the ambient atmospheric environment, the engine turbocharger (190T), the air-air radiator (220), and into the engine's internal combustion chamber: The said airpath (195) serially includes therealong: an intake-pipe (196) for thrusting ambient environmental air toward an air-cleaner (196C); an incoming-pipe (197) extending from a said air-cleaner (190C) into an engine turbocharger (e.g. 190T having turbo-charger exhaust 190TE) whereby ambient air is converted to high-pressure heated-air (HPHA) thence along an outgoing-pipe (198) through an airpath first-interface (198A) and via a secondary-pipe (198B) into air-air radiator 220 whereby HPHA is converted to high-pressure cooled-air (HPCA); and from said air-air radiator through a second-interface 199A (normally located above first-interface 198A); and finally along an inlead-pipe 199 converying HPHA into the engine's combustion chamber. Double-headed arrows in FIG. 5 directionally indicate the said airpath (195) through the lower first-interface 198A and through the upper second-interface 199A. First-interface 198A comprises mateably-telescoping tubular parts (e.g. a male part 198M carried by radiator 220 and a female member 198N carried by a said engine framework 190A). Similary, second-interface 199A comprises mateably-telescoping parts (e.g. a male part 199M carried by radiator 220 and a female part 199N carried by engine framework 190A).

In view of the foregoing technological description, it will be readily appreciated that there has been attained the sought objectives of coupling and latchably pivotably associating liquid-air and air-air radiators to the framework and airpath for internal combustion engines and whereby ease of engine and radiators servicing accomplished by expediently temporarily de-latching (202) the coupled radiators so that they can be temporarily pivoted-away (201) from the engine framework and slidably disjointed at airpath interfaces (198A, 199A).

In view of the foregoing, the construction and operation of the latchably pivotably-coupled heat-exchangers concept of the present invention will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. For within the environments of motor-home and related roadway vehicles respectively extending along a horizontal and directionally longitudinal central-axis and that terminates as a powertrain-zone terminally provided with a liquid-air radiator coupled with an air-air radiator for cooling an airpath through an engine and said airpath therealong serially including an intake-pipe for conveying environmental air (and thence serially along an incoming-pipe into an engine turbo-charger) for conversion into high-pressure-heated-air (HPHA) thence serially introduced along an outgoing-pipe through an airpath first-interface into a said air-air radiator for converting said HPHA into high-pressure-cooled-air (HPCA) emerging through an air-air radiator second-interface via an inlead-pipe that communicates within the combustion chamber of a said engine, the improvement comprising:

(A) said parallel and coupled upright liquid-air and air-air radiators being together pivotably associated with framework for said engine; and (B) said uprightly parallel, coupled, and framework pivotal liquid-air and air-air radiators, at said first-interface and at said second-interface, being respectively provided with first-removable-coupler means and with second-removable-coupler means to accommodate said coupled and pivotably associated radiators in liquid and air intercommunicating relationships as said radiators are pivotably moved toward said first-interface and second-interface portions of said airpath, said first-removable-coupler means and said second-removable-coupler means interrupting said air intercommunicating relationships upon pivoting said radiators away from said associated framework for said engine.

2. The latchably pivotably-coupled heat-exchangers of claim 1 wherein said first-removable-coupler means includes a first-tubular-coupler on the air-air radiator for mating with a first-tubular-coupling carried by the engine framework; and wherein the second-removable-coupler means includes a second-tubular-coupler carried by the air-air radiator for mating with a second-tubular-coupling carried by the engine framework.

3. The latchably pivotably-coupled heat-exchangers of claim 1 provided with shrouding means annularly surroundable about an engine-fan whenever the coupled heat-exchangers are pivoted to lie along an upright-plane perpendicular to a said longitudinal central-axis.

4. The structure of claim 3 wherein the liquid-air radiator is located nearer to said engine than is said air-air radiator and is provided with said engine-fan shrouding means; is pivotably attached to engine framework with an upright-pivot; and is provided with flexible hoses connected to and communicating with said engine.

5. The structure of claim 4 wherein said second-removable-coupler means overlies said first-removable-coupler means and including a second-tubular-coupler on the air-air radiator for mating with a second-tubular-coupling carried by the engine framework and communicating with said inlead-pipe; and wherein said first-removable-coupler means includes a first-tubular-coupler carried by the air-air radiator and a first-tubular coupling carried by the engine framework and communicating with said airpath outgoing-pipe.

\* \* \* \* \*